US012692943B2

(12) United States Patent
Barillas et al.

(10) Patent No.: US 12,692,943 B2
(45) Date of Patent: Jul. 28, 2026

(54) SEAL AND METHOD OF MAKING THE SAME

(71) Applicant: Carl Freudenberg KG, Weinheim (DE)

(72) Inventors: Gonzalo Barillas, Alsfeld-Altenburg (DE); Albert Ilinseer, Seevetal (DE); Andrej Fink, Seevetal (DE); Jens Kuhnert, Buchholz (DE); Frank Struebing, Ammersbek (DE); Roland Fietz, Neustadt-Momberg (DE)

(73) Assignee: CARL FREUDENBERG KG, Weinheim (DE)

( * ) Notice: Subject to any disclaimer, the term of this patent is extended or adjusted under 35 U.S.C. 154(b) by 27 days.

(21) Appl. No.: 18/177,786

(22) Filed: Mar. 3, 2023

(65) Prior Publication Data

US 2023/0279948 A1 Sep. 7, 2023

(30) Foreign Application Priority Data

Mar. 7, 2022 (DE) ..................... 10 2022 105 295.8

(51) Int. Cl.
*F16J 15/32* (2016.01)
*F16J 15/3208* (2016.01)

(52) U.S. Cl.
CPC ................................. *F16J 15/3208* (2013.01)

(58) Field of Classification Search
CPC .. F16J 15/3204; F16J 15/3208; F16J 15/3232; F16J 15/22
See application file for complete search history.

(56) References Cited

U.S. PATENT DOCUMENTS

| | | | | |
|---|---|---|---|---|
| 2,256,343 A * | 9/1941 | Hubbard | .................. | F16J 15/22 206/820 |
| 3,655,206 A * | 4/1972 | Adams | ..................... | F16J 15/22 277/396 |
| 6,045,136 A | 4/2000 | White | | |
| 7,543,822 B2 * | 6/2009 | Grimanis | ............. | F16J 15/3272 277/580 |
| 8,348,281 B2 * | 1/2013 | Yoshida | .................. | F16J 15/322 277/560 |
| 2004/0021274 A1 * | 2/2004 | Ueda | ......................... | F16J 15/22 277/633 |
| 2006/0006605 A1 * | 1/2006 | Grimanis | ............. | F16J 15/3224 277/500 |
| 2013/0234402 A1 | 9/2013 | Fietz | | |

(Continued)

FOREIGN PATENT DOCUMENTS

| | | |
|---|---|---|
| DE | 2705067 A1 | 8/1977 |
| DE | 102010051403 A1 | 5/2012 |

(Continued)

*Primary Examiner* — Christine M Mills
*Assistant Examiner* — L. Susmitha Koneru
(74) *Attorney, Agent, or Firm* — LEYDIG, VOIT & MAYER, LTD.

(57) ABSTRACT

A seal, including a spiralized profile string of at least one thermoplastic elastomeric material, the spiralized profile string including a retaining portion and at least one sealing lip which are arranged opposite each other in a radial direction, winding turns axially adjacent to each other in an axial direction and contiguous with each other, and open ends.

19 Claims, 2 Drawing Sheets

(56) References Cited

U.S. PATENT DOCUMENTS

| 2015/0226332 A1* | 8/2015 | Girardot ............. F16J 15/3252 |
| | | 277/560 |
| 2015/0260291 A1* | 9/2015 | Lutaud ................... F16J 15/002 |
| | | 277/562 |
| 2017/0045142 A1* | 2/2017 | Thomas ............... F16J 15/3204 |
| 2019/0120385 A1 | 4/2019 | Von Engelbrechten et al. |
| 2020/0103029 A1* | 4/2020 | Hintenlang .......... F16J 15/3228 |

FOREIGN PATENT DOCUMENTS

| DE | 102013218904 A1 | | 3/2015 |
| DE | 102018117306 A1 | * | 1/2020 |
| EP | 1701070 A1 | | 9/2006 |
| GB | 1507651 A | | 4/1978 |

* cited by examiner

SEAL AND METHOD OF MAKING THE SAME

CROSS-REFERENCE TO PRIOR APPLICATION

This application claims benefit to German Patent Application No. DE 10 2022 105 295.8, filed on Mar. 7, 2022, which is hereby incorporated by reference herein.

FIELD

The invention relates to a seal and a method of making the same.

BACKGROUND

Seals and methods of making the same are generally known, for example from DE 10 2010 051 403 A1.

The prior-art seal is a closed sealing ring.

The sealing ring comprises a plurality of sealing profiles, adjacently arranged with respect to each other, each comprising at least one sealing lip and at least one hook-shaped connecting barb, which is adjacently associated with the sealing lip when seen in the cross-section of each sealing profile.

The object on which the prior-art sealing ring is based is regarded as making it easy and cost-effective to manufacture. Moreover, the sealing ring is to be able to be supplemented by further sealing profiles in a modular fashion.

Depending on each case of application a plurality of sealing profiles can be combined to create the sealing ring. The sealing profiles can be made, for example, of plural components and are thus well adaptable to each case of application. Each sealing profile consists of an elastically flexible material, for example a polyurethane.

In a first method step, a strip-shaped sealing profile is made and cut to length in a second method step. The sealing profile cut to length is then deformed in a third method step to form a ring, wherein the two free ends of the sealing profile formed into a ring are connected with each other in a fourth method step.

The sealing profiles can be made by means of an extrusion process, for example.

From DE 27 05 067 A1, a multi-lip seal is known, comprising individual, closed sealing rings which are formed to be congruent and are fixed to each other in an axial direction by a snap engagement feature.

Often the closed sealing rings are installed in the closed state for initial assembly.

To exchange a seal, structurally demanding sealing assemblies, in particular those having a large structural size, cannot be reasonably disassembled in a time- and cost-effective manner just to replace an old seal by a new one.

Should it become necessary to replace a seal, the sealing ring, after first cutting it open, is first removed from its installation space in the sealing assembly and a new, also cut-open sealing ring is installed for example about a shaft of the sealing assembly it its installation space. This cut-open, new seal must be assembled after its installation in a joining process in perfect congruity, to avoid leakage during its use. Depending on the material of the sealing ring used, this joining process can be a pegging, adhesive gluing, welding or vulcanization process. Shaping tools and/or pins can be used as auxiliary means in the cross-section of the sealing ring.

Both the disassembly of an old sealing ring and the installation of a new one are thus undesirably time-consuming and cost-intensive.

SUMMARY

In an embodiment, the present disclosure provides a seal, comprising a spiralized profile string of at least one thermoplastic elastomeric material, the spiralized profile string including a retaining portion and at least one sealing lip which are arranged opposite each other in a radial direction, winding turns axially adjacent to each other in an axial direction and contiguous with each other, and open ends.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
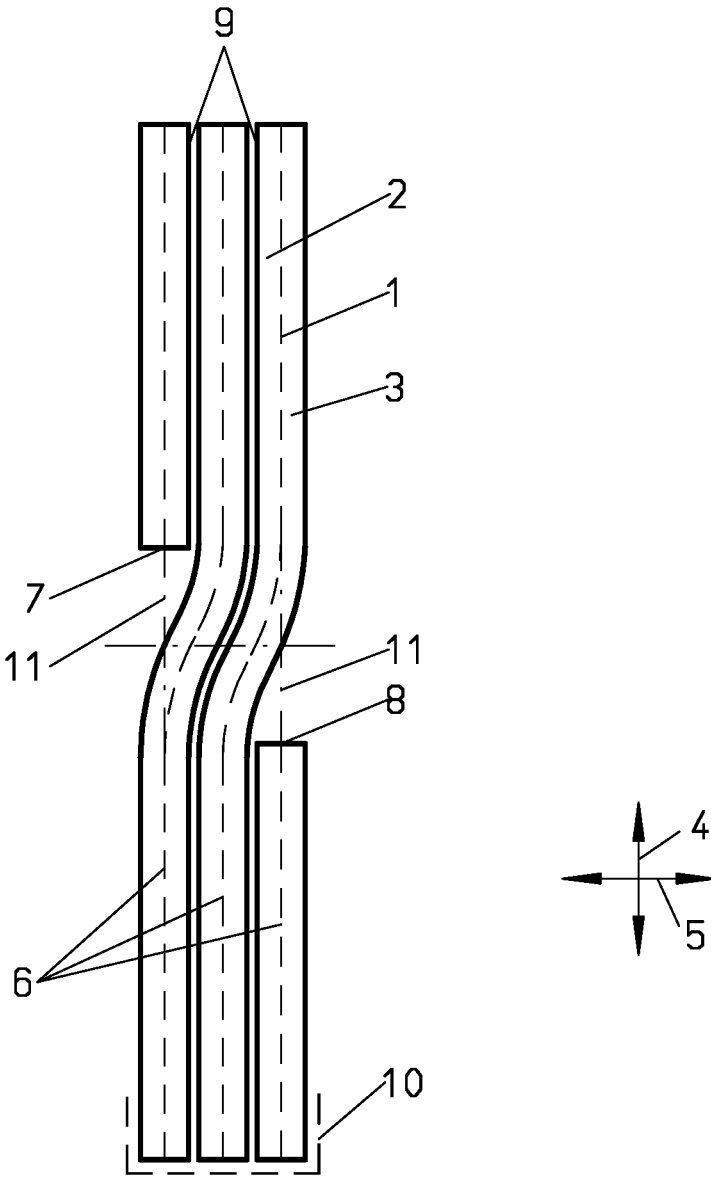
FIG. 1 schematically illustrates a seal as an individual part, wherein spiralized profile string forms a winding-turn packing.

In an embodiment, the present invention provides a seal and a method of its manufacture in such a manner that the seal is easily and cost-effectively manufacturable. Moreover, the seal is to be easily replaceable in the case of repair. In particular, disassembly of the old seal from its installation space and installation of a corresponding new seal in the installation space is to be easily possible without having to destroy the old seal during disassembly and without the need to perform a joining process on the seal after installation of the new seal.

In an embodiment, a seal is provided, comprising a spiralized profile string of at least one thermoplastic elastomeric material, comprising a retaining portion, and comprising at least one sealing lip, wherein the retaining portion and the sealing lip are arranged opposite each other in the radial direction, wherein the profile string comprises winding turns adjacently associated with each other in the axial direction and contiguous with respect to each other and has open ends on either side. Preferably, the thermoplastic elastomeric material is a TPU. Herein, it is advantageous that the seal is not formed as a closed sealing ring. Rather, the seal has the form of a conveyor screw to continuously convey the medium to be sealed back into the space to be sealed off during proper use of the seal. The medium to be sealed is, for example, a lubricating medium such as lubricating grease or oil.

It should be noted that the seal according to an embodiment of the invention works in dependence on the sense of rotation, for example in dependence on the sense of rotation of a shaft to be sealed rotating relative to the seal.

Due to the seal according to an embodiment of the invention not being a closed sealing ring, it is particularly suited to seal off large bearings, for example in wind turbine drives. In these cases, the diameters to be sealed are usually larger than 500 mm.

The winding turns adjacent in the axial direction are essentially formed to be congruent.

The winding turns have the retaining portion on one side in the radial direction and have the sealing lip on the other side in the radial direction, wherein the retaining portion and the sealing lip have an essentially constant diameter along the axial direction between the open ends. The seal is used in an installation space of a sealing assembly in which the retaining portion is fixed, for example, in a statically sealing manner, resistant to rotation, in a casing bore. The shaft to be sealed extends through the casing bore. The shaft to be sealed is sealed by the sealing lip.

The winding turns can be fixed to each other at their sides facing each other in the axial direction, by a snap engagement feature in an interlocking manner in the radial and axial directions. This is advantageous in that the individual winding turns of the spiralized profile string cannot shift relative to each other; they are arranged in a manner that is spatially fixed with respect to each other. This results in good usage properties during a long period of use, in particular a good sealing result. The snap engagement feature retains the winding within the necessary diameter in an interlocking fashion after installation of the spiralized profile string in an installation space of the sealing assembly. The installation of the spiralized profile string is always performed, i. e. both during initial installation and during a later replacement, by inserting the spiralized profile string into the installation space of a sealing assembly by initially deforming it elastically and later snap-engaging of the snap engagement feature.

The spiralized profile string is preferably arranged in its installation space under elastic axial biasing.

The winding turns can form a winding-turn packing, which has an essentially rectangular cross-section wherein the open ends are each arranged in an imaginary radial plane with each of the axially adjacent winding turns. Such a design is advantageous in that the seal has compact dimensions in the axial direction and essentially entirely fills the installation space.

The axial deformation of the spiralized profile string to an essentially rectangular winding-turn packing takes place at that position of the spiralized profile string at which the open ends of the winding are opposite each other. The offset of the deformation in the axial direction is one profile width of a winding turn.

According to an embodiment, it can be provided that the profile string is of at least one thermoplastic material and that the retaining portion and the sealing lip are integrally contiguous and are of the same material throughout. This is advantageous in that the seal is easily and cost-effectively manufacturable. It is also advantageous that the seal can be recycled in a homogeneous fashion after it has been properly used.

According to an embodiment, it can be provided for the profile string to consist of two mutually different materials for the retaining portion and the sealing lip. This is advantageous in that the retaining portion and the sealing lip are individualized in their function due to each material being particularly suitable for each case of application. This ensures that the profile string is retained within the installation space by means of the retaining portion in a particularly reliable manner and the sealing lip seals a machine element to be sealed also in a particularly reliable manner.

At least one of the materials can be a polyurethane. This material has the advantage that it is easily thermoplastically processed. Preferably the profile string is made by means of extrusion. Such a method can be carried out in an efficient and cost-effective manner. Moreover, polyurethane has good wear resistance and excellent abrasion resistance, high strength and high fracture strain. The material is resistant to mineral oils within a large temperature range and has excellent ozone and oxidation resistance. It has good damping behavior, very good low temperature flexibility and high resistance against crack formation; the material has high tear growth resistance.

In an embodiment, the method of manufacturing the seal includes, in a first method step, a spiralized profile string is made, wherein, in a second method step, the spiralized profile string is cut to length corresponding to the installation length of an installation space in a seal assembly in which the seal is to be used. The profile string is preferably extruded from thermoplastic polyurethane granules and is shaped to a sealing profile in a continuous shaping process. The sealing profile can have the above-described snap engagement feature.

The manufacturing process is particularly simple. Specific molds, as with vulcanization or tube casting of polyurethanes, are not necessary.

All that is needed is a die for a certain geometry of the profile string which can then be used for all the required different diameters.

The method is performed in such a way that granular material is plastified in an extruder and continuously shaped through a heated die.

In a third method step, the spiralized profile string can be compressed in the axial direction to form an essentially rectangular winding-turn packing, wherein, in the third method step, simultaneously with the axial compression to form the winding-turn packing, the snap engagement feature between the mutually adjacent winding turns is snap-engaged. This completes the creation of the seal which is now ready to use.

FIG. 1 shows an exemplary embodiment of the seal according to an embodiment of the invention. The seal is formed as a conveyor screw and comprises the spiralized profile string 1, including the retaining portion 2 and the sealing lip 3. The retaining portion 2 and the sealing lip 3 are arranged opposite each other in the radial direction 4. The profile string 1 comprises winding turns 6 arranged adjacent to each other in the axial direction 5 and contiguous with each other and, at its ends, includes the open ends 7, 8 on either side.

The winding turns 6 form the winding-turn packing 10 having an essentially rectangular cross-section. Each of the open ends 7, 8 is arranged in an imaginary radial plane 11 with each of the axially adjacent winding turns 6.

Figure 2:
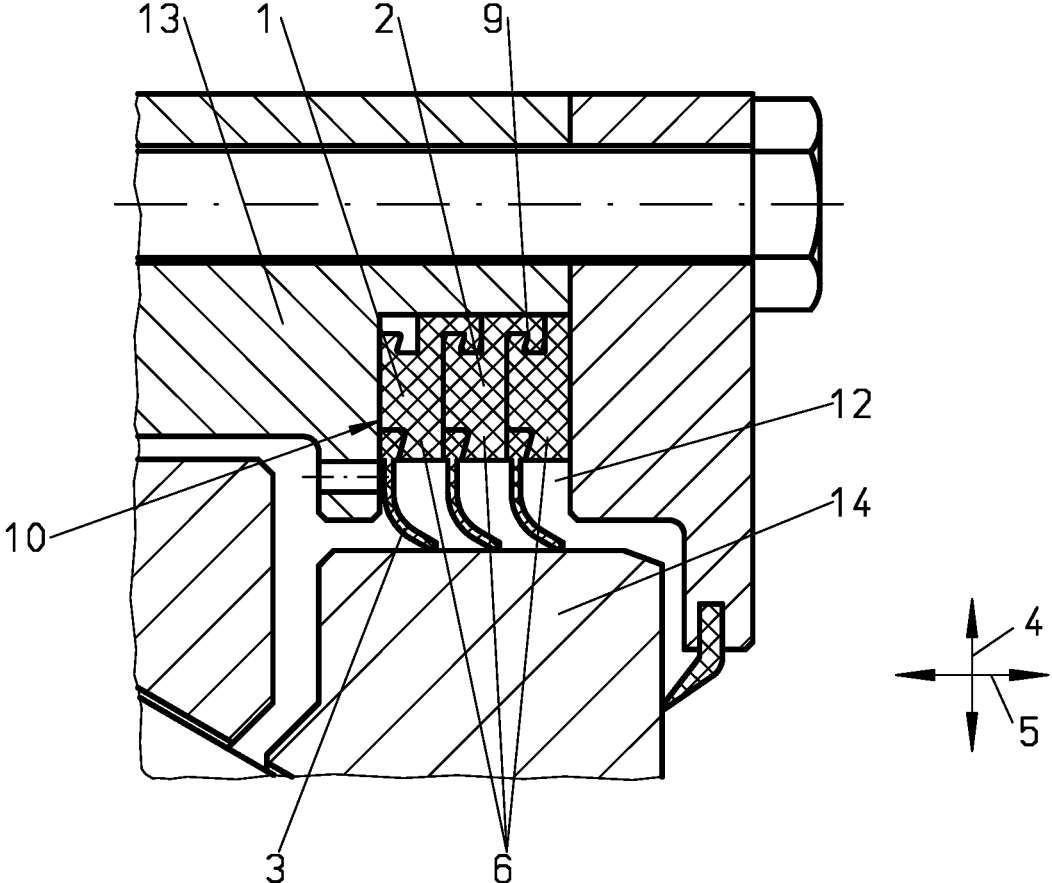
FIG. 2 schematically illustrates the seal of FIG. 1, installed in an installation space of a seal assembly.

To fix the winding turns 6 of the spiralized profile string 1 in the radial 4 and axial 5 directions in an interlocking manner, the snap engagement feature 9 is provided as shown in FIG. 2.

FIG. 2 shows a seal assembly in which the seal of FIG. 1 is installed in an installation space 12 of a casing 13. By the retaining portion 2 of the spiralized profile string 1, the seal is arranged in the installation space 12 of the casing 13 under axial biasing in a manner resistant to rotation and, with the sealing lip 3, it surrounds the machine element 14 to be sealed off, here in the form of an outer bearing shell of an antifriction bearing, under radial biasing, in a sealing manner.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A seal, comprising:
a spiralized profile string of at least one thermoplastic elastomeric material, the spiralized profile string including:
  a spiralized retaining portion forming a plurality of winding turns axially adjacent to each other in an axial direction and contiguous with each other; and
  a spiralized sealing lip which is arranged opposite the spiralized retaining portion in a radial direction and extending radially inwardly from the retaining portion,
  wherein the winding turns form a winding-turn packing having a rectangular cross-section when viewed in the radial direction, and
  wherein the spiralized profile string has open ends, each of the open ends is being arranged in a radial plane with a respective axially adjacent winding turn of the winding turns.

2. The seal according to claim 1, wherein the winding turns are formed to be congruent.

3. The seal according to claim 1, wherein the winding turns include the retaining portion on one side in the radial direction and include the sealing lip on another side in the radial direction, and
  wherein the retaining portion and the sealing lip each have a constant diameter along the axial direction between the open ends.

4. The seal according to claim 1, wherein the spiralized retaining portion is configured to interlock with itself such that the winding turns, on their sides axially facing each other, are fixed to each other in an interlocking manner in the radial and axial directions by a snap engagement.

5. The seal according to claim 1, wherein the profile string consists of a thermoplastic material, and
  wherein the retaining portion and the sealing lip are integrally contiguous with each other and consist of the same material throughout.

6. The seal according to claim 1, wherein the profile string comprises two mutually different materials for the retaining portion and the sealing lip.

7. The seal according to claim 6, wherein at least one of the materials is a polyurethane.

8. A method of manufacturing the seal according to claim 1, comprising:
  in a first method step, making a spiralized profile string, and
  in a second method step, cutting the spiralized profile string to length in accordance with an installation length of an installation space in a seal assembly.

9. The method according to claim 8, comprising, in a third method step, compressing the spiralized profile string in the axial direction to form the essentially rectangular winding-turn packing.

10. The method according to claim 9, wherein the third method step includes engaging the snap engagement between the winding turns simultaneously with the axial compression to form the winding-turn packing.

11. The seal according to claim 1, wherein the open ends delimit the spiralized profile string such that the spiralized profile string winds about an axis corresponding to the axial direction from a first of the open ends to a second of the open ends.

12. The seal according to claim 11, wherein the retaining portion is a unitary body from the first of the open ends to the second of the open ends.

13. The seal according to claim 11, wherein the at least one sealing lip is a unitary body from the first of the open ends to the second of the open ends.

14. The seal according to claim 1, wherein the spiralized profile string is configured to be wound about an axis corresponding to the axial direction such that the spiralized profile string is axially deformed, and an offset of the axial deformation is one width of a winding turn.

15. The seal according to claim 1, wherein the open ends include an open face that extends within a plane extending in the axial direction and the radial direction.

16. The method according to claim 1, wherein the sealing lip at a respective winding turn of the winding turns is spaced apart relative to the sealing lip at a further winding turn of the winding turns, the respective winding turn being axially adjacent to and abutting the further winding turn.

17. The method according to claim 16, wherein the sealing lip, at at least one winding turn of the winding turns, abuts against the retaining portion at an axially adjacent winding turn of the winding turns.

18. The method according to claim 4, wherein the snap engagement includes a protrusion of the retaining portion extending in the axial and radial directions, and wherein the protrusion is configured to engage with a corresponding recess of the retaining portion.

19. The method according to claim 18, wherein the protrusion comprises a u-shaped hook that extends radially outward, then axially, then radially inward to form an end of the hook, and wherein the end of the hook is configured to engaged with the corresponding recess of the retaining portion.

* * * * *